(12) United States Patent
Serpa (10) Patent No.: US 6,587,091 B2
(45) Date of Patent: Jul. 1, 2003

(54) STABILIZED TACTILE OUTPUT MECHANISM FOR COMPUTER INTERFACE DEVICES (76) Inventor: Michael Lawrence Serpa, P.O. Box 478, San Francisco, CA (US) 94104

( * ) Notice: Subject to any disclaimer, the term of this patent is extended or adjusted under 35 U.S.C. 154(b) by 81 days.

(21) Appl. No.: 09/840,344

(22) Filed: Apr. 23, 2001

(65) Prior Publication Data

US 2002/0154094 A1 Oct. 24, 2002

(51) Int. Cl.[7] .............................. G09G 5/00; G09G 5/08
(52) U.S. Cl. .................. 345/156; 345/157; 345/160; 345/163; 345/167; 345/168
(58) Field of Search ........................... 345/156, 157, 345/160, 163, 167, 168, 701, 702; 463/37; D14/117.2, 117.3, 117.5

(56) References Cited

U.S. PATENT DOCUMENTS

| 4,868,549 | A | | 9/1989 | Affinito et al. |
| 5,146,566 | A | | 9/1992 | Hollis, Jr. et al. |
| 5,172,092 | A | | 12/1992 | Nguyen et al. |
| 5,311,208 | A | | 5/1994 | Burger et al. |
| 5,589,828 | A | | 12/1996 | Armstrong |
| 5,682,132 | A | | 10/1997 | Hiroyoshi et al. |
| 5,691,898 | A | | 11/1997 | Rosenberg et al. |
| 5,692,956 | A | | 12/1997 | Rifkin |
| 5,747,906 | A | | 5/1998 | Tajima et al. |
| 5,790,108 | A | | 8/1998 | Salcudean et al. |
| 5,805,140 | A | | 9/1998 | Rosenberg et al. |
| 5,861,686 | A | | 1/1999 | Lee |
| 5,914,705 | A | * | 6/1999 | Johnson et al. ............. 345/163 |
| 6,001,014 | A | * | 12/1999 | Ogata et al. .................. 463/37 |
| 6,088,019 | A | | 7/2000 | Rosenberg |
| 6,100,874 | A | | 8/2000 | Schena et al. |
| 6,128,006 | A | | 10/2000 | Rosenberg et al. |
| 6,166,723 | A | | 12/2000 | Schena et al. |
| 6,256,011 | B1 | * | 7/2001 | Culver ....................... 345/157 |

* cited by examiner

Primary Examiner—Bipin Shalwala
Assistant Examiner—Jimmy H. Nguyen

(57) ABSTRACT

A force feedback mechanism designed for use with a mouse, trackball, keyboard, or other interface device manipulated by a user. The mechanism consists of a non-planar surface 11 that is substantially balanced with respect to a rotational axis "A." An actuator 12 controlled by a computer or microprocessor is connected to the non-planar surface 11. In response to signals from the computer or microprocessor the actuator 12 causes the non-planar surface 11 to rotate about its rotational axis "A", thus conveying force feedback to the user's thumb or fingertip.

6 Claims, 8 Drawing Sheets

STABILIZED TACTILE OUTPUT MECHANISM FOR COMPUTER INTERFACE DEVICES

BACKGROUND OF THE INVENTION

The present invention relates generally to interface devices by which users interface with computer systems, and more particularly to computer interface devices that both enable users to provide input to a computer system and convey force feedback from the computer system to the user.

Computer systems in use today typically have a visual display and audio speakers which provide system output and a variety of interface devices that serve system input functions. Common user/computer interface devices include keyboards, mice, trackballs, touch pads, joysticks, tablets, as well as other devices.

Most of these interface devices are specifically engineered to control the position and/or location of a cursor or object on the display. Sensor's on the interface device convert a user's manipulation of the device into locative signals that are sent to the computer via either a line cord or "wireless" means. The computer responds to the locative signals by moving the cursor or object.

Because most input devices require manual manipulation by a user, they are ideally suited to also serve as devices for transmitting tactile or haptic feedback to the user. This feedback, commonly referred to as "force feedback," consists of a physical sensation that is felt by the user manipulating the device. For example, designs have been offered that combine a computer mouse with a vibrating module which generates an output signal in the form of a tactile vibration. Other arrangements provide joysticks or game controllers that, through a connection to a motor, convey movement of some sort that can be sensed by a user.

There are many practical applications for this tactile feedback. They range from computer systems intended for use by the vision or hearing impaired to game systems that enhance a user's experience through force feedback. It may very well be, however, that tactile output devices will soon become as commonplace as computer keyboards or visual displays.

A variety of tactile output apparatuses, many of which combine a cursor positioning device with a force feedback generator, are offered by the prior art. Probably the simplest arrangement is the mouse/vibrating module combination described above. Though useful, this arrangement suffers from a disadvantage in that the force feedback comes from a vibrating module. The vibration output of the module could cause a user to inadvertently reposition the mouse, thus changing on the display the position or location of the object controlled by the mouse. Furthermore, because the entire device would tend to vibrate when the vibrating module is activated, it would be useless to employ more than one module on the mouse to increase the number of signaling combinations because a user would have difficulty distinguishing which module is generating a particular vibration signal.

Finally, there is a risk that other internal components of the mouse could be damaged over time as a result of the vibration output.

More complex cursor positioning device/tactile output arrangements require armatures, gimbals, linkages, magnets, gear drives, special manipulation surfaces, etc. The complexity of these devices, however, makes them relatively more expensive to manufacture and possibly less reliable. In addition, these arrangements are suitable only in applications where extreme movement of the device (as opposed to discrete, isolated, tactile output) is acceptable.

One disclosure describes a computer mouse with a force feedback control wheel. The control wheel performs cursor control functions and also provides various forms of force feedback to a user such as a resistance to the user's manipulation of the wheel, rotation of the wheel in both directions, a tendency for the wheel to stop at various points in its rotation, and a vibration motion of the wheel.

As are some of the other arrangements that have been offered, this design is complicated to manufacture. One significant problem is that the device requires a motor or actuator that can reverse directions or do the other things mentioned in the disclosure and also be powerful enough to provide such movement while the wheel is engaged by a finger of the user. Urging of the control wheel by the user in a direction opposite that of the motion provided by the motor or actuator might cause excessive wear (or even break the device under some circumstances). Though the combination of a cursor positioning control wheel with force feedback capability might appeal to some users, a simpler and more reliable design could be preferable for many applications.

BRIEF SUMMARY OF THE INVENTION

The present invention overcomes the above-described limitations of the prior art by disclosing a mechanism for producing a stabilized force feedback. "Stabilized" in this context means a tactile output that remains isolated to a particular location without imparting any collateral motion to the device in which it is installed. The mechanism provided by the present invention is suitable for use in combination with virtually any sort of computer interface device (such as a mouse, a keyboard, a touch pad, or a trackball) and is simple in design, cost-effective to manufacture, and reliable in operation.

These goals are accomplished through the use of a non-planar surface that is generally circular in shape and balanced with respect to a rotational axis. An actuator, in response to instructions received from a computer, rotates the non-planar surface at a relatively high rate of revolutions per minute (though even at slower speeds the mechanism will convey tactile output). When a user contacts the rotating non-planar surface the user will detect tactile computer output similar to that output produced by a vibrating module. But because (like an airplane propeller) the non-planar surface is balanced with respect to its rotational axis, the rotating non-planar surface does not generate any collateral vibration or cause any movement of the particular interface device in which the tactile output mechanism is installed.

By isolating the tactile output to the non-planar surface the present invention allows the use of multiple tactile output mechanisms in a single computer input device. An example of this would be a computer mouse that has two or three tactile output mechanisms located in areas where a user's thumb or fingertips might rest when using the mouse. This type of arrangement cannot be accomplished with vibrating modules since a vibration tactile output signal would tend to vibrate the entire mouse (making it difficult for a user to distinguish which vibrating module is generating the tactile output signal).

Including more than one tactile output mechanism in a single computer input device greatly expands the force feedback signaling possibilities. For instance, each of the various mechanisms could signal a different thing to a user with its tactile output. Or, multiple mechanisms could generate concurrent tactile output signals to indicate something else. In another arrangement the tactile output signal might "scroll" through the separate mechanisms to create a third type of force feedback message.

The particular use of the tactile output signal would depend upon software designers. But, because the present invention permits the use of multiple tactile output mechanisms, the force feedback signaling possibilities (and uses) are endless.

These and other advantages of the present invention will become apparent to those skilled in the art upon a reading of the following specification of the invention and a study of the several figures of the drawings.

DETAILED DESCRIPTION OF PREFERRED EMBODIMENTS

Figure 1:
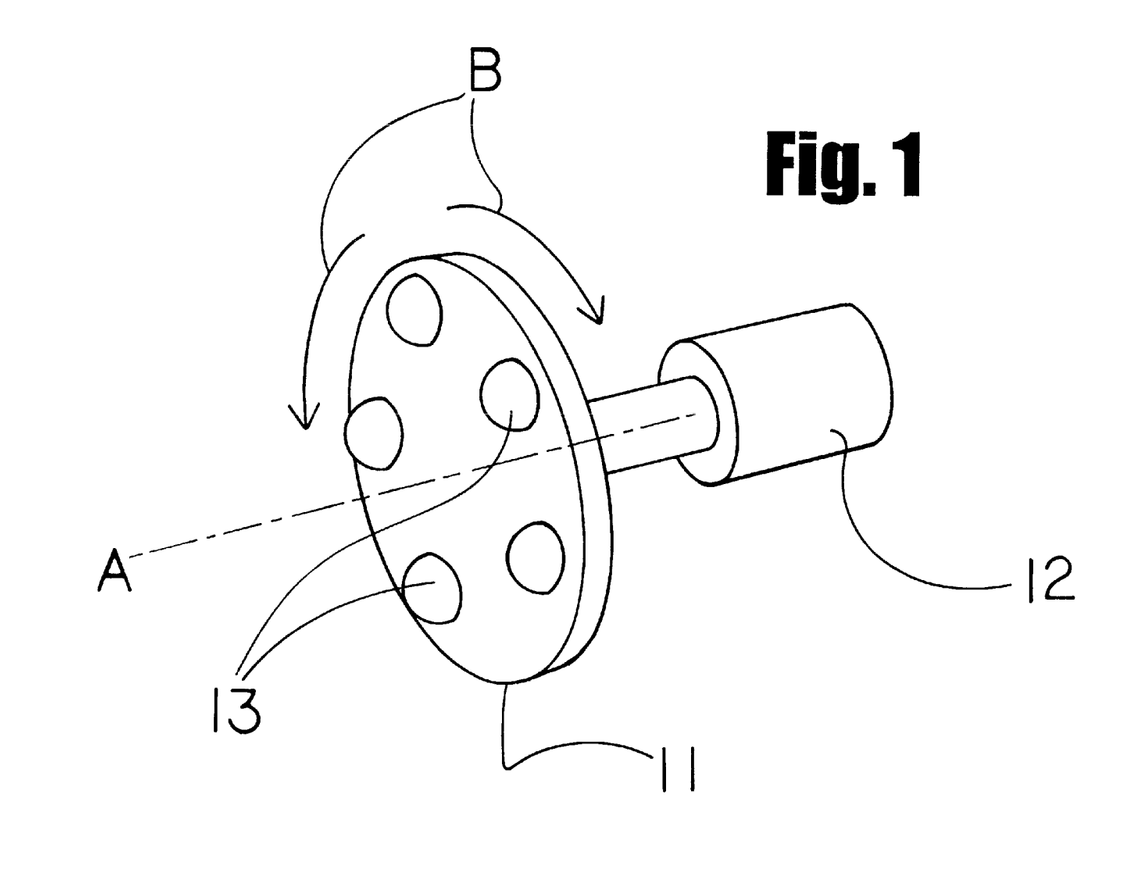
FIG. 1 is a perspective view of a basic embodiment of the invention.

FIG. 1 shows a basic embodiment of the mechanism provided by present invention. An uneven or non-planar surface (11) is substantially balanced with respect to a rotational axis "A". The non-planar surface (11) is connected to an actuator (12) which, in response to an instruction from a host computer (not shown), causes the non-planar surface (11) to rotate about the rotational axis "A" in a direction indicated generally by arrows "B" (either a clockwise or counter-clockwise rotation is acceptable). Because the non-planar surface (11) is balanced, rotation of the non-planar surface by the actuator does not generate any significant vibration. The only resulting movement is the rotation.

The non-planar surface (11) is substantially in alignment with and perpendicular to the rotational axis "A." Though it can be constructed in a variety of sizes, for most applications the non-planar surface (11) would ideally have a diameter slightly in excess of the width of a user's thumb or fingertip. The non-planar surface (11) can be made from plastic or any other acceptable material.

If a user rests a fingertip on the non-planar surface (or on a membrane covering the non-planar surface as will be explained below), any rotational movement of the non-planar surface will convey a tactile sensation to the user. Ideally, the revolutions per minute of the non-planar surface would be at a level high enough to create a uniform "vibration-like" sensation.

The actuator (12), by reacting to output signals from a host computer, is "computer controlled." That is, the force produced by the actuator is modulated by (though not shown here) a microprocessor, a host computer system, or other electronic device. Computer communication signals can be sent to the actuator via a line cord or by wireless transmission/reception. If a line cord is used it could also serve to provide a power supply for the actuator, whereas common dry-cell batteries might be used as a power source if the particular interface device is wireless.

Any mechanism capable of rotating the non-planar surface (11) can serve as the actuator (12). Some examples of acceptable actuators are electric motors, pneumatic or hydraulic actuators, and the like.

Figure 2A:
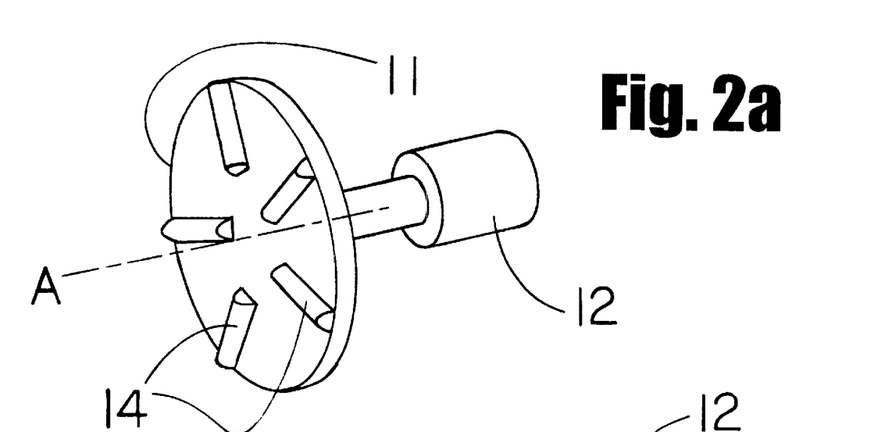
FIGS. 2a, 2b, and 2c are perspective views displaying alternative embodiments of the non-planar surface from the present invention.
Figure 2B:
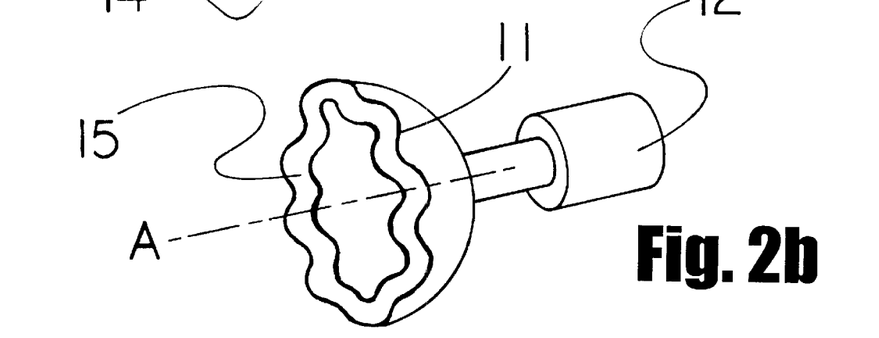
Figure 2C:
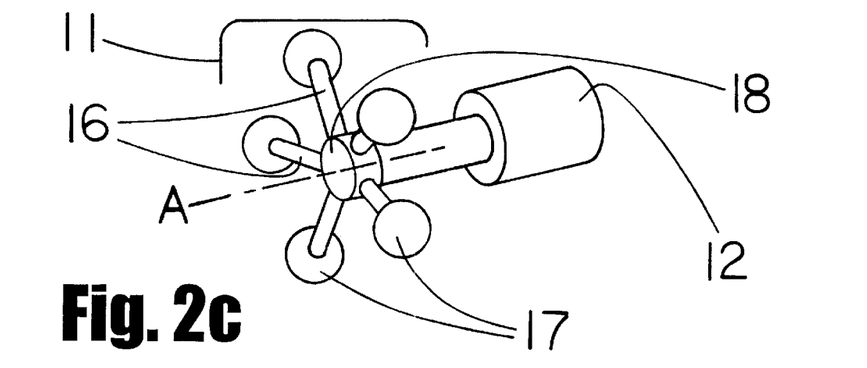

The non-planar surface (11) itself can take a variety of forms. For example, as shown in FIG. 1, it can consist of a disk covered with small dome-shaped protrusions (13). Other possible configurations are shown in FIGS. 2a, 2b, and 2c. In the FIG. 2a example the non-planar surface (11) consists of a disk that includes raised ridges (14). FIG. 2b shows a cup-shaped object with a scalloped rim (15). FIG. 2c displays an arrangement where spokes (16) capped with spheres (17) protrude from a central hub (18).

The most critical single feature shared by all these configurations is a non-planar surface (11) that is balanced with respect to its rotational axis "A." When rotated about this rotational axis the non-planar surface can convey a tactile sensation to a user. The examples shown here are not intended to indicate all possible configurations for the present invention. Rather, they are intended only as examples of the many possible variations consistent with this disclosure. Many other configurations are possible and are intended to be covered by the present application so long as they operate as described herein.

Figure 3A:
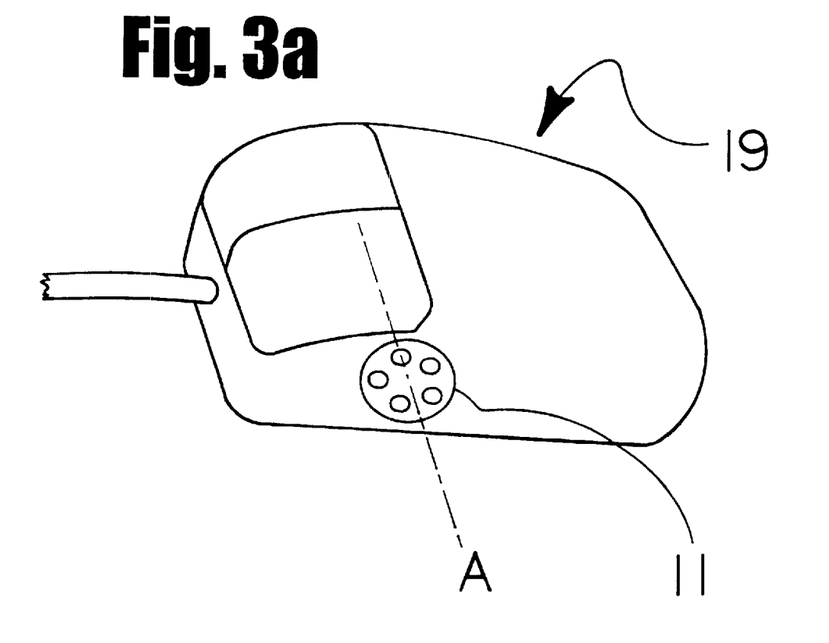
FIG. 3a is a perspective view of one embodiment of the present invention installed in a computer mouse.

Each of these illustrated embodiments will convey a tactile output (i.e., force feedback) to a user when the user contacts the non-planar surface while the non-planar surface is rotated by the actuator. FIG. 3 shows one embodiment of the present invention installed in a mouse (19). The non-planar surface (11) is situated on the mouse (19) in a location where, for example, a user's thumb could comfortably rest. In this installation the actuator, though not shown, could be contained within the mouse (19). The non-planar surface (11) is positioned in an aperture in the housing of the mouse (19). When the actuator rotates the non-planar surface (11) and a user's fingertip is in contact with the non-planar surface (11), the user would sense the rotation though touch as a result of the uneven nature of the non-planar surface (11). To the user, this tactile output would be similar to that produced by a vibrating module. But because the non-planar surface (11) is balanced around the rotational axis "A," the rotation of the non-planar surface does not disturb or shake the mouse (19) in the way the vibration of a vibrating module would. The mouse (19) remains unaffected by the force feedback created by the non-planar surface (11).

To increase the number of force feedback signaling possibilities the mouse (19), or other device, could include more than one of the mechanism described herein. Because the tactile output from each mechanism would be isolated to its non-planar surface, a typical user could distinguish among output signals from multiple non-planar surfaces. This represents a significant advantage over the use of vibrating modules.

Figure 3B:
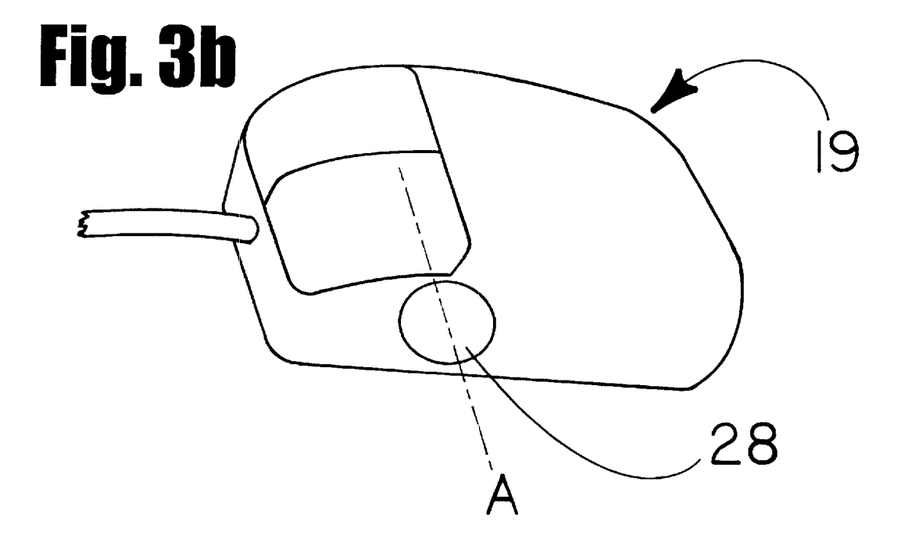
FIG. 3b is a perspective view of the present invention installed in a computer mouse and covered by a membrane.

In many installations it would be preferable to cover the non-planar surface (11) with a membrane of some sort. A membrane would serve two important practical purposes. First, a membrane would protect the non-planar surface (11) from dirt or other contaminants. Second, a membrane would insulate the user's fingertip from friction created by the rotating non-planar surface (11). FIG. 3*b* illustrates how a mouse installation of the present invention would appear if the non-planar surface was covered with a membrane (28). The membrane (28) would not rotate with the non-planar surface. Rather, the membrane (28) would be fixed in place (attached, in this example, to the housing of the mouse). An ideal combination for the membrane would include a friction-reducing material, such as TEFLON, on the side abutting the non-planar surface and a durable aesthetically-pleasing material on the side contacted by the user. Many materials would be acceptable (used either alone or in combination) as long as they are thin enough and flexible enough to permit a user to detect the tactile output of the non-planar surface.

Figure 4:
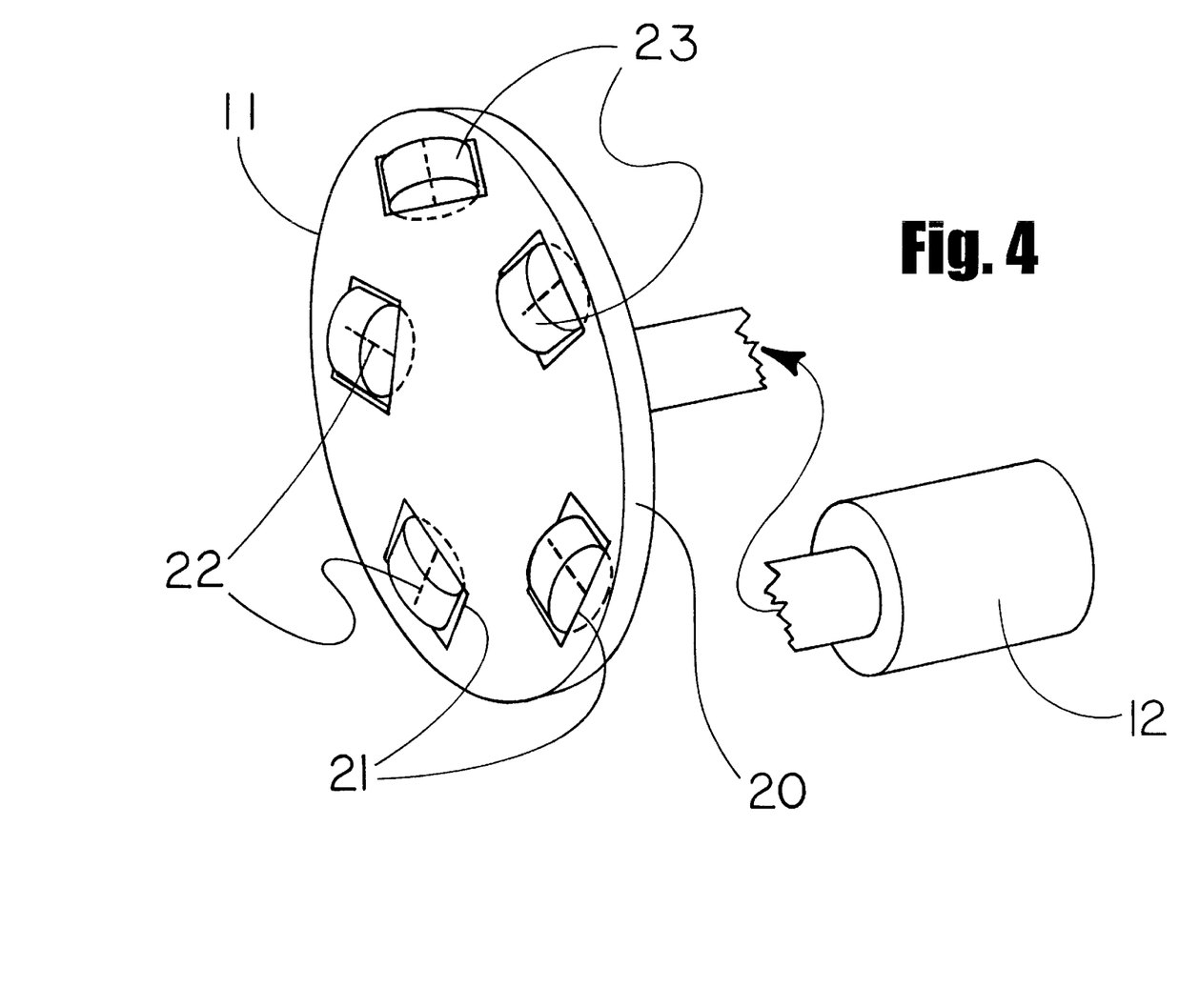
FIG. 4 is a perspective view of an alternative embodiment of the present invention that includes mechanical features for reducing friction.

More sophisticated constructions of the non-planar surface (11) have mechanical features for reducing friction between a user's finger and the rotating non-planar surface. One of these constructions is shown in FIG. 4. The non-planar surface (11) results from a disk (20) with openings (21) located near the rim of the disk (20). Installed within the openings (21) on axles (22) are wheels (23) and each wheel (23) is free to rotate on its axle (22). The wheels (23) are of a sufficient diameter such that they create a non-planar surface (11) on the disk (20). The disk (20) would be connected to an actuator (not shown) and, when rotated by the actuator, would convey tactile output. The friction-reducing effect would result from the wheels (23) rotating on their axles (22) as the disk (20) rotates. The wheels thus act as bearings.

The wheels (23) themselves can be disc-shaped or spherical. If spherical, the wheels (23) could be retained within a groove or cavities that permit the wheels to act as floating ball-bearings. In this arrangement the axles (22) would be eliminated.

The embodiment illustrated in FIG. 4 could also be covered by a membrane as described above.

Referring back to FIG. 2*c*, if the spheres (17) were rotatably mounted to the spokes (16), this would comprise another embodiment incorporating a mechanical friction-reducing feature.

Figure 5:
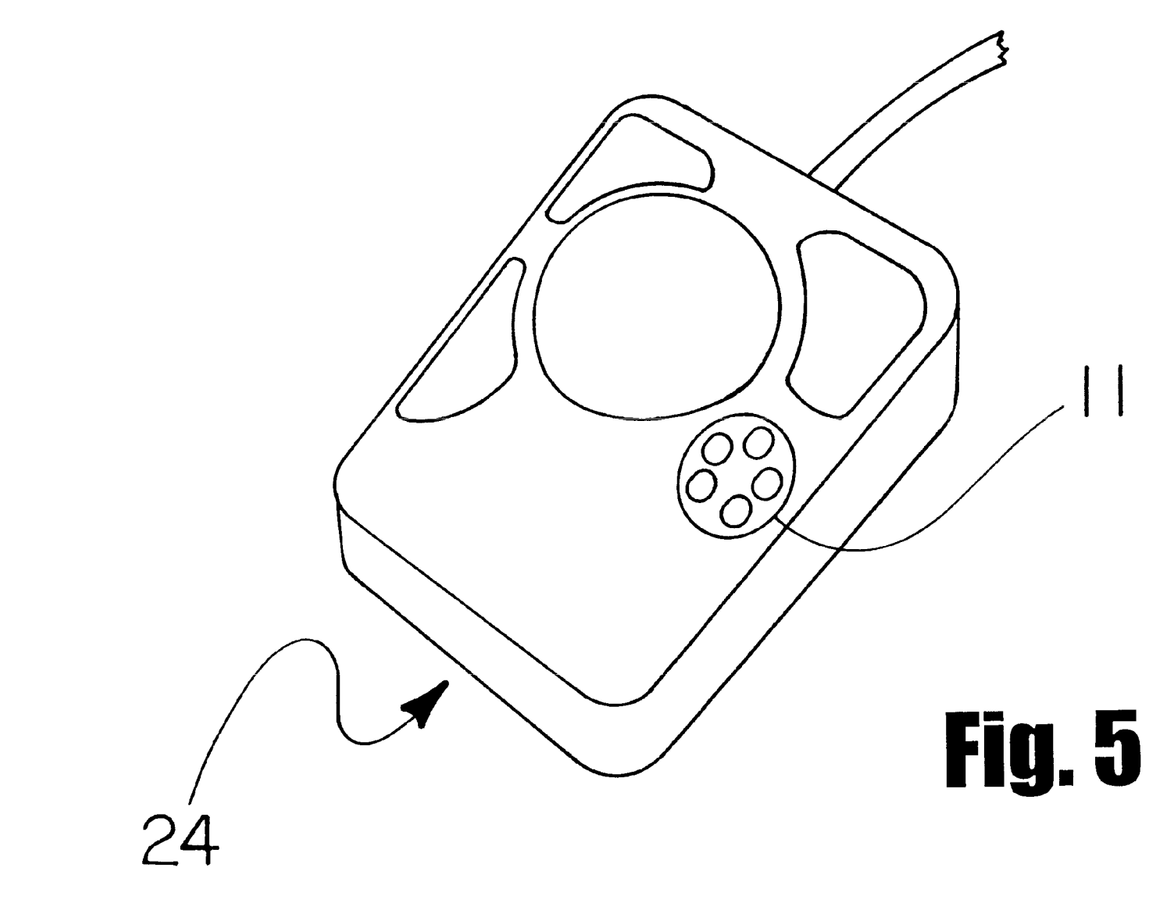
FIG. 5 is a perspective view of one embodiment of the present invention installed in a trackball unit.

FIG. 5 exhibits the present invention in combination with a trackball unit (24). The non-planar surface (11) is located generally in a area where a user's thumb could comfortably rest while the user is operating the trackball unit (24). As with other installations, the non-planar surface (11) can be covered with a membrane as describe above.

Figure 6:
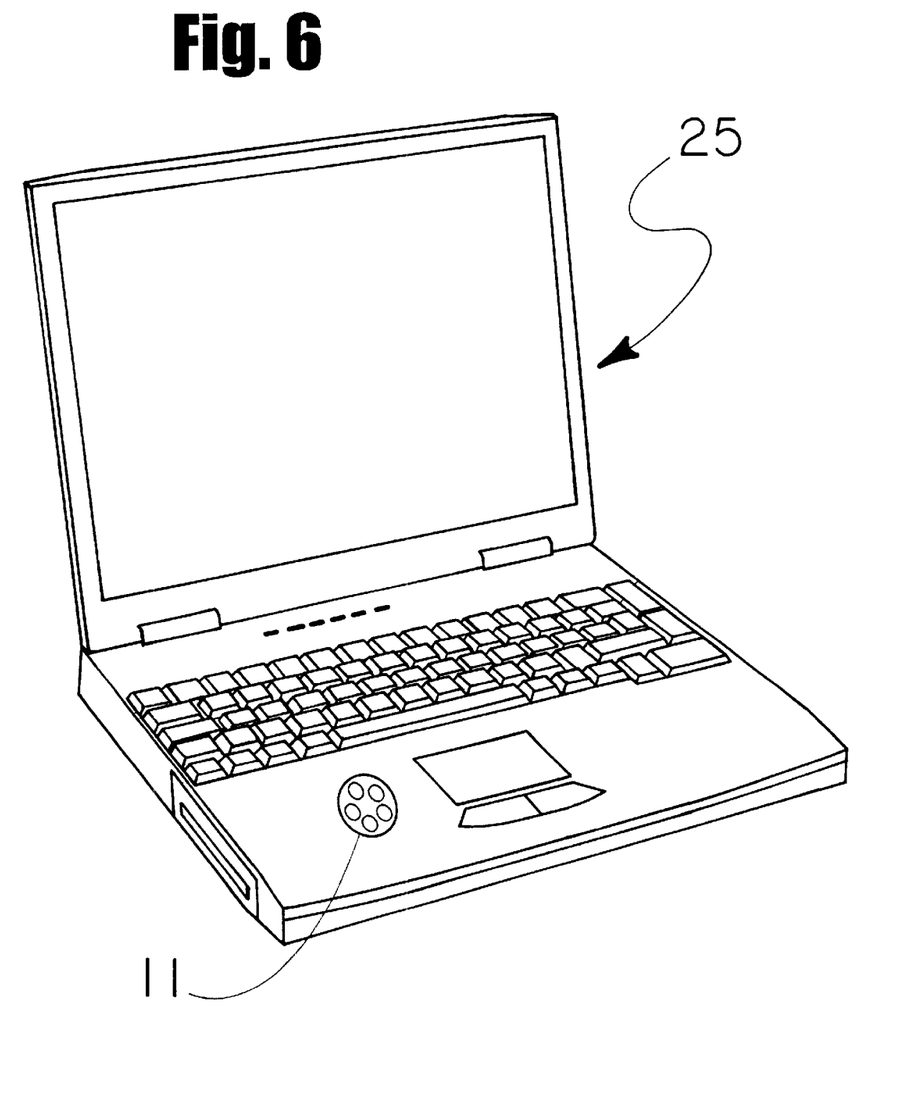
FIG. 6 is a perspective view of one embodiment of the present invention installed in a laptop computer.
Figure 7:
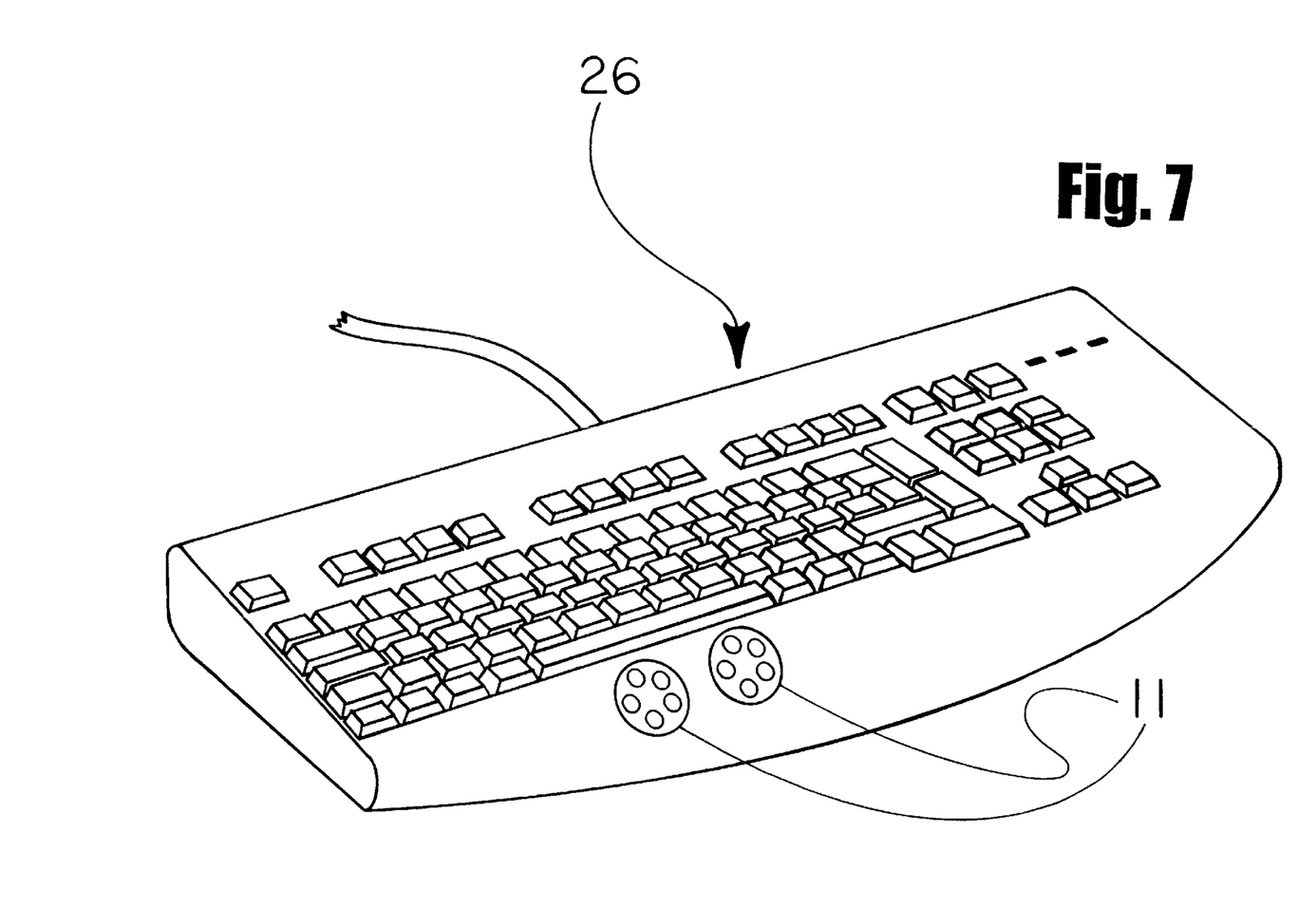
FIG. 7 is a perspective view of one embodiment of the present invention installed in a conventional computer keyboard.

FIG. 6 shows one embodiment of the present invention installed in a laptop computer (25), and FIG. 7 shows the same embodiment installed in a conventional computer keyboard (26). Though shown uncovered in both FIG. 6 and FIG. 7, the non-planar surface (11) could be covered by a membrane in these installations as well.

Figure 8:
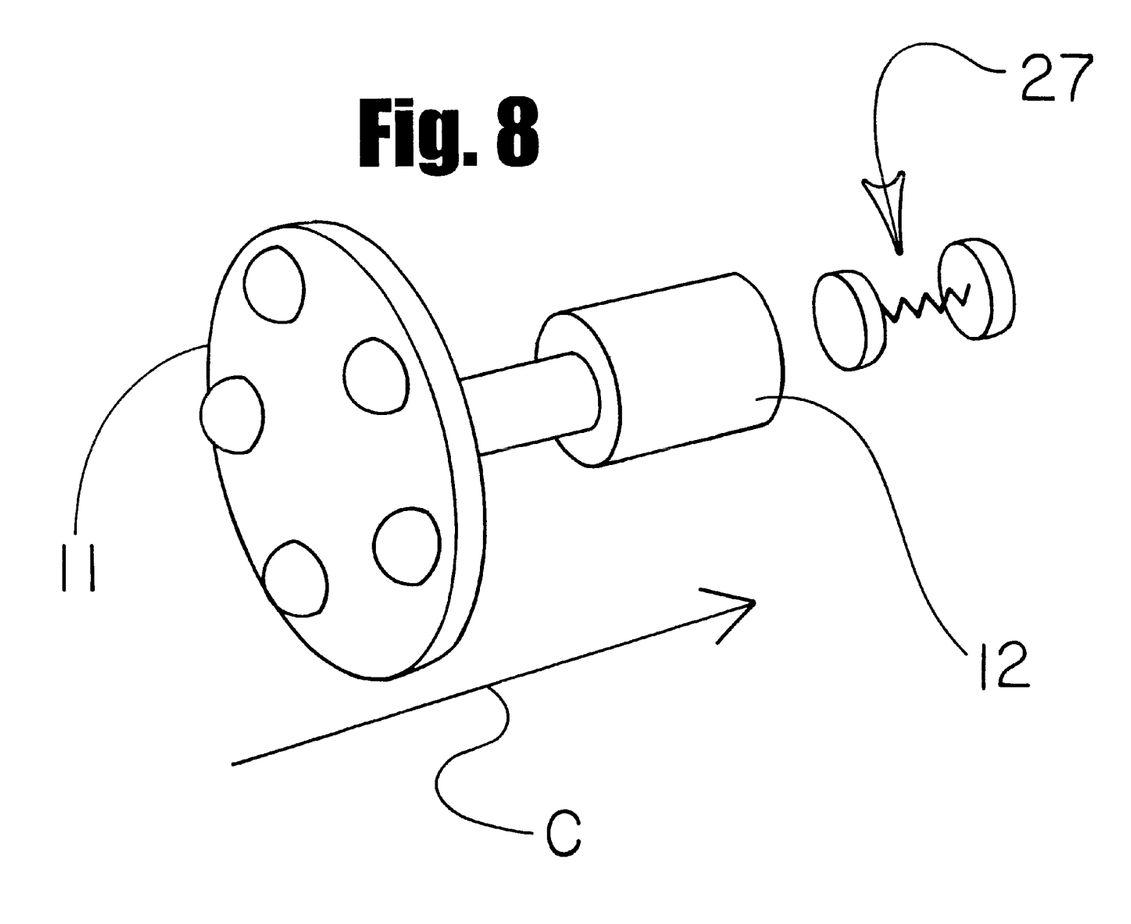
FIG. 8 is a perspective view of one embodiment of the present invention in combination with a click switch.

Another embodiment of the present invention is shown in FIG. 8. This embodiment combines the non-planar surface (11)/actuator (12) tactile output mechanism with a click switch or push button similar to those that are used in a computer mouse. The non-planar surface (11)/actuator (12) slidably mounted as a unit such that they can move slightly in the direction of arrow "C" and recoil a similar distance in the opposite direction. A spring contact (27) is situated to engage the non-planar surface (11)/actuator (12) when a user urges them in the direction of arrow "C." When the spring contact (27) is thus engaged a circuit is closed and a resulting signal is sent to an associated microprocessor or host computer (not shown). The spring action of the spring contact (27) will then return the non-planar surface (11) and actuator (12) to their original position.

Combining the present invention's tactile output mechanism with a push button or click switch can be accomplished in many ways other than as shown in FIG. 8. The description contained herein is given as an example only and this disclosure is intended to encompass other methods that accomplish the same result. Furthermore, the embodiment illustrated in FIG. 8, like each of the previous embodiments, is suitable for use with virtually any sort of computer interface device.

Ramifications and Scope

The ability to sense system output through touch can greatly increase productivity and opens the door to many possibilities. Adding a force feedback feature to a manually-operated input device will enable users to interact with computers on an entirely new level.

A significant limitation of the prior art is overcome by the present invention in that this disclosure describes a mechanism that can provide stabilized and isolated tactile output. Because the output is stabilized a single computer input device can include multiple tactile output mechanisms to increase the force feedback signaling possibilities. (For example, the various tactile output mechanisms could deliver concurrent or alternating force feedback signals.) And because the tactile output is isolated to a contact point between a user and the mechanism, computer system security is enhanced since only a user handling the input device could detect the tactile output (i.e., the computer input device would not jostle from the tactile output signal as it might if a vibrating module were employed).

While this invention has been described in terms of several preferred embodiments, it is contemplated that alterations, permutations, and equivalents of the embodiments will become apparent to those skilled in the art. For example, many types of actuators can be employed, linked either directly or indirectly to the non-planar surface. The non-planar surface itself can be constructed in numerous fashions. It is therefore intended that the following appended claims include all such alterations, permutations, and equivalents as fall within the true spirit and scope of the present invention.

I claim:

1. A manually-operated device for providing input to a computer, the manually-operated device including one or more mechanisms for providing force feedback from the computer to a user;

each of the one or more mechanisms for providing force feedback comprising a non-planar surface, the non-planar surface being capable of rotating about a rotational axis and further being substantially balanced with respect to the rotational axis;

an actuator or actuators coupled to the non-planar surface(s), the actuator or actuators being computer modulated;

the actuator or actuators further being responsible for causing a rotational movement of each of the non-planar surface(s) about their respective rotational axes; and one or more of the non-planar surface(s) including moving mechanical parts intended to reduce friction between the non-planar surface(s) and a thumb or digit of a user.

2. A manually-operated device as recited in claim 1 where one or more of the non-planar surface(s) is/are covered by a membrane or membranes.

3. A mechanism for providing tactile output from an electronic device such as a computer, comprising:

an actuator, a non-planar surface coupled to the actuator, the actuator configured to cause the non-planar surface to rotate about a rotational axis, the non-planar surface being substantially balanced with respect to the rotational axis and the non-planar surface further being oriented substantially perpendicular to the rotational axis;

the actuator being responsive to a computer and the actuator further being coupled to the non-planar surface and operative to rotate the non-planar surface in one or both directions according to instructions received by the actuator from the computer; and the non-planar surface including mechanical features for reducing friction between the non-planar surface and a thumb or digit of a user when the tactile output is delivered to said user.

4. The mechanism for providing tactile output from an electronic device such as a computer as recited in claim 3, the non-planar surface being covered by a membrane arranged so that the non-planar surface is free to rotate without causing a corresponding rotational movement of the membrane.

5. The mechanism for providing tactile output from an electronic device such as a computer as recited in claim 3, the non-planar surface being slidably or moveably mounted in a direction substantially parallel with its axis of rotation to allow the non-planar surface to act in combination with a push button or click switch.

6. The mechanism for providing tactile output from an electronic device such as a computer as recited in claim 3, the non-planar surface being slidably or moveably mounted in a direction substantially parallel with its axis of rotation to allow the non-planar surface to act in combination with a push button or click switch; and the non-planar surface further being covered by a membrane and arranged so that the non-planar surface is free to rotate without causing a corresponding rotational movement of the membrane.

\* \* \* \* \*